United States Patent
Persson et al.

(10) Patent No.: US 8,846,772 B2
(45) Date of Patent: Sep. 30, 2014

(54) SILICA-BASED SOLS

(75) Inventors: Michael Persson, Västra Frölunda (SE); Freddie Hansson, Kungälv (SE); Annika Viola Pal, Öjersjö (SE); Lars Lindahl, Fjärås (SE); Joakim Carlén, Göteborg (SE)

(73) Assignee: Akzo Nobel N.V., Arnhem (NL)

( * ) Notice: Subject to any disclaimer, the term of this patent is extended or adjusted under 35 U.S.C. 154(b) by 823 days.

(21) Appl. No.: 12/663,407

(22) PCT Filed: Jun. 4, 2008

(86) PCT No.: PCT/SE2008/050657
§ 371 (c)(1),
(2), (4) Date: Jan. 7, 2010

(87) PCT Pub. No.: WO2008/150230
PCT Pub. Date: Dec. 11, 2008

(65) Prior Publication Data
US 2010/0170419 A1    Jul. 8, 2010

Related U.S. Application Data

(60) Provisional application No. 60/933,636, filed on Jun. 7, 2007.

(30) Foreign Application Priority Data

Jun. 7, 2007    (EP) ..................................... 07109790

(51) Int. Cl.
| | |
|---|---|
| C04B 14/04 | (2006.01) |
| D21H 21/10 | (2006.01) |
| D21H 17/68 | (2006.01) |
| C01B 33/149 | (2006.01) |
| C01B 33/143 | (2006.01) |
| D21H 17/37 | (2006.01) |
| D21H 17/42 | (2006.01) |
| D21H 23/04 | (2006.01) |
| D21H 17/44 | (2006.01) |

(52) U.S. Cl.
CPC .......... C01B 33/1435 (2013.01); *D21H 17/375* (2013.01); *D21H 17/42* (2013.01); D21H 21/10 (2013.01); *D21H 23/04* (2013.01); D21H 17/68 (2013.01); *D21H 17/44* (2013.01); *C01B 33/149* (2013.01)
USPC .............................. 516/80; 106/483; 106/489

(58) Field of Classification Search
CPC ............... B01J 2523/31; B01J 37/0244; B01J 35/1019; B01J 21/04; B01J 20/28097; B01J 21/08; B01J 2219/312; B01J 23/8872; B01J 35/1023; B01J 37/036; B82Y 30/00; D21H 17/67; D21H 21/52
USPC ................................... 516/80; 106/483, 489
See application file for complete search history.

(56) References Cited

U.S. PATENT DOCUMENTS

| | | | | |
|---|---|---|---|---|
| 3,024,089 | A | * | 3/1962 | Cosman et al. ............... 423/336 |
| 3,031,322 | A | | 4/1962 | Bugosh |
| 4,388,150 | A | | 6/1983 | Sunden et al. |
| 4,600,735 | A | * | 7/1986 | Larsson et al. ................ 523/216 |
| 4,961,825 | A | | 10/1990 | Andersson et al. |
| 4,980,025 | A | | 12/1990 | Andersson et al. |
| 5,127,994 | A | | 7/1992 | Johansson |
| 5,176,891 | A | | 1/1993 | Rushmere |

(Continued)

FOREIGN PATENT DOCUMENTS

| | | |
|---|---|---|
| EP | 0 227 346 A3 | 7/1987 |
| EP | 0 335 195 A2 | 10/1989 |

(Continued)

OTHER PUBLICATIONS

Biddle, D. et al., "Characterisation of colloidal silica particles with respect to size and shape . . . scattering measurements," Elsevier Science, 188 (1996) pp. 89-95.

(Continued)

*Primary Examiner* — Bijan Ahvazi
*Assistant Examiner* — Chun-Cheng Wang
(74) *Attorney, Agent, or Firm* — Robert C. Morriss

(57) ABSTRACT

The invention relates to a sol containing silica-based particles having an axial ratio of at least about 10 and specific surface area of at least about 600 m2/g. The invention further relates to a sol containing silica-based particles having an axial ratio of at least about 10 and S-value up to about 25. The invention further relates to a sol containing silica-based particles having an axial ratio of at least about 10 and a specific surface area of at least about 400 m2/g, wherein the silica-based particles are surface-modified. The invention further relates to a sol containing silica-based particles having a viscosity of at least 50 cP and silica content of at least about 3% by weight, wherein the silica-based particles have a specific surface area of at least about 400 m2/g. The invention further relates to a process for producing the aqueous silica-based sol according to the invention, a sol containing silica-based particles obtainable by the process, use of the sol containing silica-based particles as a flocculating agent. The invention further relates to a process for producing paper in which the sol containing silica-based particles is used as a drainage and retention aid.

47 Claims, No Drawings

(56) References Cited

U.S. PATENT DOCUMENTS

| | | | |
|---|---|---|---|
| 5,221,497 A | 6/1993 | Watanabe et al. | |
| 5,368,833 A * | 11/1994 | Johansson et al. | 423/338 |
| 5,547,607 A | 8/1996 | Ando et al. | |
| 5,597,512 A | 1/1997 | Watanabe et al. | |
| 5,603,803 A | 2/1997 | Raak | |
| 5,603,805 A | 2/1997 | Andersson et al. | |
| 6,231,720 B1 | 5/2001 | Mouri et al. | |
| 6,245,422 B1 | 6/2001 | Onishi et al. | |
| 6,372,806 B1 | 4/2002 | Keiser et al. | |
| 6,440,545 B1 | 8/2002 | Hisano et al. | |
| 6,486,216 B1 | 11/2002 | Keiser et al. | |
| 6,632,489 B1 | 10/2003 | Watanabe et al. | |
| 6,951,638 B1 | 10/2005 | Burgfels et al. | |
| 7,048,859 B1 * | 5/2006 | Moffett | 210/714 |
| 2005/0020699 A1 | 1/2005 | Isobe et al. | |
| 2005/0269050 A1 | 12/2005 | Klass et al. | |

FOREIGN PATENT DOCUMENTS

| | | |
|---|---|---|
| EP | 1 114 794 A1 | 7/2001 |
| EP | 1 619 171 A2 | 1/2006 |
| JP | 2007-153671 A | 6/2007 |
| WO | WO 94/05596 A1 | 3/1994 |
| WO | WO 95/23021 A1 | 8/1995 |
| WO | WO 98/30753 A1 | 7/1998 |
| WO | WO 98/56715 A1 | 12/1998 |
| WO | WO 00/66491 A1 | 11/2000 |
| WO | WO 00/66492 A1 | 11/2000 |
| WO | WO 00/75074 A1 | 12/2000 |
| WO | WO 01/46072 A1 | 6/2001 |
| WO | WO 2005/097678 A1 | 10/2005 |
| WO | WO 2005/100241 A1 | 10/2005 |

OTHER PUBLICATIONS

Iler, R. K. et al., "Degree of Hydration of Particles of Colloidal Silica in Aqueous Solution," J. Phys. Chem. 60 (1956), pp. 955-957.

Sears, JR. G. W., "Determination of Specific Surface Area of Colloidal Silica by Titration with Sodium Hydroxide," Analytical Chemistry vol. 28, No. 12 (1956), pp. 1981-1983.

International Search Report with Written Opinion for International Application No. PCT/SE2008/050657 mailed Nov. 14, 2008.

English language machine translation dated Oct. 25, 2012 of JP 2007-153671 A.

JP Office Action for Japanese Patent Application No. 2010-511145 dated Oct. 2, 2012.

JP English translation of Office Action for Japanese Patent Application No. 2010-511145 dated Oct. 2, 2012.

Japanese Office Action dated Jan. 7, 2014 for related Application No. 2010-511145.

English translation of Japanese Office Action dated Jan. 7, 2014 for related Application No. 2010-511145.

English abstract of JP 2007-153671 A published Jun. 21, 2007.

* cited by examiner

SILICA-BASED SOLS

This application is a national stage filing under 35 U.S.C. §371 of PCT/SE2008/050657, filed Jun. 4, 2008, which claims priority to European Patent Application No. 07109790.1, filed Jun. 7, 2007, and U.S. Provisional Patent Application No. 60/933,636, filed on Jun. 7, 2007, the contents of which are incorporated herein by reference in their entirety.

FIELD OF THE INVENTION

The present invention relates to silica-based sols and their production and use. The present invention provides silica-based sols with high stability and $SiO_2$ contents as well as improved drainage and retention performance in papermaking.

BACKGROUND OF THE INVENTION

In the papermaking art, an aqueous suspension containing cellulosic fibers, and optional fillers and additives, is fed into a headbox which ejects the cellulosic suspension onto a forming wire. Water is drained from the cellulosic suspension to provide a wet paper web which is further dewatered and dried in the drying section of the paper machine. Drainage and retention aids are conventionally introduced into the cellulosic suspension to facilitate drainage and increase adsorption of fine particles onto the cellulosic fibers so that they are retained with the fibers.

Sols of silica-based particles are widely used as drainage and retention aids, usually in combination with charged organic polymers. Such additive systems are among the most efficient now in use in the papermaking industry, in particular those comprising silica-based sols which contain microgel or aggregated particles of high surface areas. Examples of silica-based sols of this type include those disclosed in U.S. Pat. Nos. 5,176,891; 5,368,833; 5,603,805 and 6,372,806 as well as International Patent Appl'n Pub. Nos. WO 98/30753; 98/56715; 00/66491; 00/66492; 2005/097678 and 2005/100241.

Spherical silica-based particles can grow and aggregate in various ways depending on the conditions. Under certain conditions, the particles grow symmetrically, thus maintaining a spherical shape. Under other conditions, the spherical particles aggregate to clusters of particles and form three dimensional networks and microgels. Silica-based particles may also form elongated aggregates that are more or less linear, thus forming aggregates with different degrees of aggregation in different directions or axes.

High surface area aqueous silica-based sols containing microgel usually have poor stability and high dilution is normally necessary to avoid complete gelation. Because of the stability problems associated with such products, and the prohibitive cost of shipping stable but extremely dilute products, high surface area aqueous silica-based sols containing microgel are preferably prepared at the location of intended use, for example at the paper mill.

Sols of aggregated silica-based particles can be defined by means of different parameters, including S-value and axial ratio. The S-value indicates the degree of aggregate or microgel formation; a lower S-value is indicative of a higher degree of aggregation of the silica-based particles. The axial ratio is applicable to elongated aggregates of silica particles and indicates the ratio of the long axis to the short axis.

It would be advantageous to be able to provide silica-based sols with improved drainage and retention performance. It would also be advantageous to be able to provide silica-based sols and, in particular, aggregate or microgel containing silica-based sols with improved surface area stability at very high surface areas and $SiO_2$ contents. It would also be advantageous to be able to provide a method for producing such silica-based sols. It would also be advantageous to be able to provide a papermaking process with improved drainage and retention performance.

SUMMARY OF THE INVENTION

The present invention is generally directed to a sol containing silica-based particles having an axial ratio of at least 10 and a specific surface area of at least 600 $m^2/g$.

The present invention is further generally directed to a sol containing silica-based particles having an axial ratio of at least about 10 and an S-value up to about 35.

The present invention is further generally directed to a sol containing silica-based particles having an axial ratio of at least 10 and a specific surface area of at least about 400 $m^2/g$, wherein the silica-based particles are surface-modified.

The present invention is further generally directed to a sol containing silica-based particles having a viscosity of at least 50 cP and silica content of at least about 3% by weight, wherein the silica-based particles have a specific surface area of at least about 400 $m^2/g$.

The present invention is further generally directed to a process for producing a sol containing silica-based particles which comprises:
(a) providing a reaction vessel containing water and a cationic ion exchange resin having at least part of its ion exchange capacity in hydrogen form;
(b) adding to said reaction vessel an aqueous alkali metal silicate at a rate of at least about 400 g $SiO_2$ per hour and kg ion exchange resin present in the reaction vessel to form an aqueous silicate slurry;
(c) stirring said aqueous silicate slurry until the pH of the aqueous phase is in the range of from about 5.0 to about 9.0;
(d) adding one or more alkaline materials to the aqueous phase to form a pH in the range of from about 7.0 to about 11.0; and
(e) separating said ion exchange resin from the aqueous phase after step (c) or after step (d).

The present invention is also generally directed to a process for producing a sol containing silica-based particles which comprises:
(a) providing a reaction vessel containing water and a cationic ion exchange resin having at least part of its ion exchange capacity in hydrogen form;
(b) adding to said reaction vessel an aqueous alkali metal silicate to form an aqueous silicate slurry;
(c) stirring said aqueous silicate slurry until the pH of the aqueous phase is in the range of from about 5.0 to about 8.5;
(d) adding one or more alkaline materials to the aqueous phase to form a pH in the range of from about 7.0 to about 8.5; and
(e) separating said ion exchange resin from the aqueous phase after step (c) or after step (d).

The invention is further directed to a sol containing silica-based particles obtainable by the process according to the invention.

The invention is further directed to various uses of the sol containing silica-based particles according to the invention such as a flocculating agent, in particular as a drainage and retention aid in papermaking and as a flocculating agent for water purification.

The invention is further generally directed to a process for producing paper which comprises
(a) providing an aqueous suspension comprising cellulosic fibers;
(b) adding to the suspension one or more drainage and retention aids comprising a sol containing silica-based particles according to the invention; and
(c) dewatering the obtained suspension to provide a sheet or web of paper.

DETAILED DESCRIPTION OF THE INVENTION

In accordance with the present invention there is provided sols containing silica-based particles, also referred to herein as silica-based sols, which are suitable for use as flocculating agents in papermaking and water purification, in particular as drainage and retention aids in papermaking. The term "drainage and retention aids", as used herein, refers to one or more additives which, when added to an aqueous cellulosic suspension, give better drainage and/or retention than what is obtained when not adding the said one or more additives. The silica-based sols of the invention exhibit good stability over extended periods of time, notably high axial ratio and surface area stability and high stability to complete gel formation. The silica-based sols further result in improved drainage and retention when used in papermaking. Hereby the present invention makes it possible to increase the speed of the paper machine and to use a lower dosage of additive to give a corresponding drainage and retention effect, thereby leading to an improved paper making process and economic benefits.

The aqueous silica-based sol according to the invention contains silica-based particles, i.e. particles based on silica or $SiO_2$, that are preferably anionic and preferably colloidal, i.e., in the colloidal range of particle size. Aqueous dispersions of this type are usually referred to as sols. Preferably, the silica-based particles have been prepared by condensation polymerisation of siliceous compounds, e.g. silicic acids and silicates, which can be homo or co-polymerised. The silica-based sols can be modified and contain other elements, e.g. aluminum, boron, nitrogen, zirconium, gallium and titanium, which can be present in the aqueous phase of the sol and/or in the silica-based particles. Such elements may also be present in the silica-based sols as impurities.

The silica based sols according to the invention contains asymmetric or elongated silica-based particles. Preferably, such asymmetric particles are modelled as ellipsoids of revolution characterised by the axial ratio, i.e. the ratio of the long axis to the short axis. Particle asymmetry affects the translational and rotational diffusion coefficients of colloidal silica-based particles and also the viscosity of their sols or solutions. These properties can be used to determine the axial ratio, either directly or indirectly, using a combination of viscosity and dynamic light scattering. The silica-based sol of the invention usually has an axial ratio of at least about 10 or at least about 11, suitably at least 12 and preferably at least 13. Usually, the axial ratio is up to about 100 or up to about 50, suitably up to about 40 and preferably up to about 35. The axial ratios given herein represent the average axial ratio of the silica-based particles present in a sol. The axial ratio is measured and calculated as described by D. Biddle, C. Walldal and S. Wall in Colloids and Surfaces, A: Physiochemical and Engineering Aspects 118 (1996), 89-95, determining dimensions and axial ratios of equivalent unsolvated prolate ellipsoids. This ellipsoid model is characterised by the ratio between the longer diameter (a) and the shorter diameter (b). The axial ratio is defined as a/b. The model used is a combination of data obtained from intrinsic viscosity measurements and dynamic light scattering measurements and the relations of Simha and Perrin for the intrinsic viscosity and fractional factors respectively of ellipsoids of revolution. These data can then be used to iterate a mathematical fit to the ellipsoid form, thus giving the axial ratio describing the shape of the silica-based particles.

The silica-based sol of the invention usually has an S-value of at least about 4% or at least about 6%, suitably at least 8% and preferably at least 10%. Usually, the S-value is up to about 50% or up to about 35%, suitably up to about 30% and preferably up to about 25%. The S-value is measured and calculated as described by R. K. Iler & R. L Dalton in J. Phys. Chem. 60 (1956), 955-957. The S-value of a silica-based sol indicates the degree of aggregate or microgel formation and a lower S-value is indicative of a higher degree of aggregate or microgel formation.

The silica-based particles present in the sol usually have a specific surface area of at least about 400 $m^2/g$ or at least about 500 $m^2/g$, suitably at least about 600 $m^2/g$ or at least about 700 $m^2/g$, preferably at least about 800 $m^2/g$ and more preferably at least about 1000 $m^2/g$. The specific surface area is usually up to 1600 $m^2/g$ or at least about 1500 $m^2/g$, suitably up to about 1400 $m^2/g$ and preferably up to about 1300 $m^2/g$. The specific surface area is measured by means of titration with NaOH as described by G. W. Sears, Jr. in Analytical Chemistry 28 (1956):12, 1981-1983, after appropriate removal of or adjustment for any compounds present in the sample that may disturb the titration like aluminum and boron compounds, for example as described by Sears and in U.S. Pat. No. 5,176,891. The specific surface areas given herein represent the average specific surface area of the silica-based particles present in a sol.

In one embodiment of the invention, the silica-based sol is modified with aluminum. Examples of suitable aluminium compounds include those defined herein. According to this embodiment, the silica-based particles are preferably at least surface-modified with aluminum. If modified with aluminum, the silica-based sol usually has a mole ratio of Si:Al of from about 1:1 to 40:1, suitably from about 3:1 to 30:1 and preferably from about 5:1 to 20:1.

In one embodiment of the invention, the silica-based sol is modified with an organic nitrogen-containing compound. Examples of suitable organic nitrogen-containing compounds include those defined herein. According to this embodiment, the silica-based particles are preferably at least surface-modified with the organic nitrogen-containing compound. If modified with an organic nitrogen-containing compound, the silica-based sol usually have a mole ratio of Si:N of from about 1:1 to 50:1, suitably from about 2:1 to 40:1 and preferably from about 2.5:1 to 25:1.

The silica-based sol of the invention usually has a mole ratio of Si:X, where X=alkali metal, of at least 5:1, suitably at least 6:1, preferably at least about 7:1 and most preferably at least 8:1. The mole ratio of Si:X, where X=alkali metal, is usually up to 30:1, suitably up to 20:1, preferably up to 15:1 and more preferably up to 12:1.

The silica-based sol of the invention usually has a pH of at least about 6.0 or at least about 6.5, suitably at least about 7.0, at least about 7.5 or at least about 8.0. Usually, the pH of the silica-based sol is up to about 12.0 or up to about 11.0, suitably up to about 10.5, up to about 10.00, or even up to 9.5, up to about 9.0 or it can be up to 8.5 or up to about 8.0.

The silica-based sol of the invention usually has a silica ($SiO_2$) content of at least about 2% by weight, suitably at least about 3 by weight or at least about 4 by weight and preferably at least about 5 by weight. Usually, the silica content is up to about 30% by weight or up to about 20 by weight, suitably up to about 15 by weight and preferably up to about 10 by weight. In order to simplify shipping and reduce transportation costs, it is generally preferable to ship high concentration silica-based sols according to the invention but it is of course possible and usually preferable to dilute and mix the silica-based sols to substantially lower silica contents prior to use, for example to silica contents within the range of from 0.05 to 2% by weight, in order to improve mixing with the furnish components.

The viscosity of the silica-based sol of the invention can vary depending on, for example, the silica content of the sol. Usually, the viscosity is at least about 5 cP, often at least about 10 cP or at least about 20 cP, and it may even be at least about 50 cP or at least 75 cP. Usually, the viscosity is up to about 200 cP or up to about 175 cP, suitably up to about 150 cP. The viscosity can be measured by means of known technique, for example using a Brookfield LVDV II+viscosimeter.

The silica-based sol of the invention is preferably stable. Preferably, the silica-based sol maintains certain of its parameters over a certain period of time. Usually, the sol maintains an axial ratio of at least about 10, suitably at least about 11 and preferably at least about 12 for at least 3 months on storage or ageing at 20° C. in dark and non-agitated conditions. Suitably, these axial ratios are maintained at a silica content of at least about 3 by weight and preferably at least about 5 by weight. Usually, the sol maintains a specific surface area of at least about 400 $m^2/g$ or at least about 600 $m^2/g$, suitably at least about 800 $m^2/g$ and more preferably at least about 1000 $m^2/g$ for at least 3 months on storage or ageing at 20° C. in dark and non-agitated conditions. Suitably, these specific surface areas are maintained at a silica content of at least about 3 by weight and preferably at least about 5 by weight. Usually, the sol maintains the above defined viscosity values for at least 3 months on storage or ageing at 20° C. in dark and non-agitated conditions. Suitably, these viscosity values are maintained at a silica content of at least about 3 by weight and preferably at least about 5 by weight.

The silica-based sols of the invention can be produced by a process that is simple, quick and easy to control and regulate.

Step (a) of the process comprises providing a reaction vessel comprising an aqueous phase containing water and an ion exchange resin. The ion exchange resin used in the process is cationic and has at least part of its ion exchange capacity in the hydrogen form, i.e. an acid cationic ion exchange resin, preferably a weak acid cationic ion exchange resin. Suitably, the ion exchange resin has at least 40% of its ion exchange capacity in the hydrogen form, preferably at least 50%. Suitable ion exchange resins are provided on the market by several manufacturers, for example Amberlite™ IRC84SPI from Rohm & Haas. Preferably, a reaction vessel equipped with means for mixing, e.g. a stirrer, is charged with the ion exchange resin and water. Preferably, the ion exchange resin is regenerated by addition of an acid, e.g. sulphuric acid, preferably according to manufacturer's instruction.

Step (b) of the process comprises adding an aqueous alkali metal silicate to the reaction vessel containing water and the ion exchange resin, preferably regenerated ion exchange resin, to form an aqueous silicate slurry. Usually, the aqueous alkali metal silicate is added to the reaction vessel at a rate of at least about 400, suitably at least about 450 and preferably at least about 500 g $SiO_2$ per hour and kg ion exchange resin present in the reaction vessel. Usually, the rate is up to about 10000 or up to about 7000, suitably up to about 5000 and preferably up to about 4000 g $SiO_2$ per hour and kg ion exchange resin present in the reaction vessel.

Examples of suitable aqueous alkali metal silicates or water glass include conventional materials, e.g. lithium, sodium and potassium silicates, preferably sodium silicate. The molar ratio of silica to alkali metal oxide, e.g. $SiO_2$ to $Na_2O$, $K_2O$ or $Li_2O$, or a mixture thereof, in the silicate solution can be in the range of from 15:1 to 1:1, suitably in the range of from 4.5:1 to 1.5:1, preferably from 3.9:1 to 2.5:1. The aqueous alkali metal silicate used can have a $SiO_2$ content of from about 2 to about 35% by weight, suitably from about 5 to about 30% by weight, and preferably from about 15 to about 25% by weight. The pH of the aqueous alkali metal silicate is usually above 11, typically above 12.

According to a preferred embodiment of the invention, step (b) of the process comprises keeping or maintaining the temperature of the aqueous silicate slurry that is formed at from at least about 0, suitably at least about 5 and preferably at least about 10° C. up to about 80 or up to 50, suitably up to about 40 and preferably up to about 35° C. This can be achieved by cooling or controlling the temperature of the reaction vessel while adding the aqueous alkali metal silicate to the reaction vessel containing water and the ion exchange resin.

Step (c) of the process comprises stirring the aqueous silicate slurry until its aqueous phase reaches a certain pH-value. Usually, the aqueous phase has a pH of at least about 5.0, suitably at least about 6.0 or at least about 6.5, preferably at least about 7.0. Usually, the aqueous phase reaches a pH of up to about 9.0, suitably up to about 8.5 and preferably up to about 8.0. Preferably, particle growth takes place while stirring the aqueous silicate slurry. The silica-based particles formed usually have a specific surface area of at least 300 $m^2/g$, suitably at least about 600 $m^2/g$ and preferably at least about 1000 $m^2/g$. The specific surface area is usually very high, for example up to about 1600 $m^2/g$ or up to about 1400 $m^2/g$. Suitably, the slurry is stirred to allow particle aggregation and, preferably, formation of elongated aggregates of silica-based particles. The stirring usually takes place during a period of time of from about 1 to about 480 minutes, suitably from about 3 to about 120 minutes and preferably from about 5 to about 60 minutes.

According to one embodiment of the invention, step (c) of the process comprises keeping or maintaining the temperature of the aqueous silicate slurry while being stirred at from at least about 0° C., suitably at least about 5° C. and preferably at least about 10° C. up to about 80° C. or up to 50° C., suitably up to about 40° C. and preferably up to about 35° C. This can be achieved by cooling or controlling the temperature of the reaction vessel while stirring the aqueous silicate slurry.

If desired, additional water can be to the reaction vessel during or after step (c) to lower the viscosity of the aqueous phase and reduce the speed of particle growth, particle aggregation and formation of elongated aggregates of silica-based particles.

Step (d) of the process comprises adding one or more alkaline materials to the aqueous phase. Usually, the addition of said one or more alkaline materials increases the pH of the aqueous phase to at least about 6.0 or at least about 6.5, suitably at least about 7.0, at least about 7.5 or at least about 8.0. Usually, the pH of the aqueous phase is up to about 12.0 or up to about 11.0, suitably up to about 10.5, up to about 10.00, or even up to 9.5, up to about 9.0 or it can be up to 8.5 or up to about 8.0. Preferably, at least one alkaline material is added, either singly or in combination with at least one second material.

Examples of suitable alkaline materials include aqueous alkali metal silicates, e.g. any of those defined above, preferably sodium silicate; aqueous alkali metal hydroxides, e.g. sodium and potassium hydroxides, preferably sodium hydroxide; ammonium hydroxide; alkaline aluminum salts, e.g. aluminates, suitably aqueous aluminates, e.g. sodium and potassium aluminates, preferably sodium aluminate.

Examples of suitable second materials include aluminum compounds and organic nitrogen-containing compounds. Examples of suitable aluminum compounds include neutral and essentially neutral aluminum salts, e.g. aluminum nitrate, alkaline aluminum salts, e.g. any of those defined above, preferably sodium aluminate.

Examples of suitable organic nitrogen-containing compounds include primary amines, secondary amines, tertiary amines and quaternary amines, the latter also referred to as quaternary ammonium compounds. The nitrogen-containing compound is preferably water-soluble or water-dispersible. The amine can be uncharged or cationic. Examples of cationic amines include acid addition salts of primary, secondary and tertiary amines and, preferably, quaternary ammonium compounds, as well as their hydroxides. The organic nitrogen-containing compound usually has a molecular weight below 1,000, suitably below 500 and preferably below 300. Preferably, a low molecular weight organic nitrogen-containing compound is used, for example those compounds having up to 25 carbon atoms, suitably up to 20 carbon atoms, preferably from 2 to 12 carbon atoms and most preferably from 2 to 8 carbon atoms. In a preferred embodiment, the organic nitrogen-containing compound has one or more oxygen-containing substituents, for example with oxygen in the form of hydroxyl groups and/or alkyloxy groups. Examples of preferred substituents of this type include hydroxy alkyl groups, e.g. ethanol groups, and methoxy and ethoxy groups. The organic nitrogen-containing compounds may include one or more nitrogen atoms, preferably one or two. Preferred amines include those having a pKa value of at least 6, suitably at least 7 and preferably at least 7.5.

Examples of suitable primary amines, i.e. amines having one organic substituent, include alkyl amines, e.g. propyl amine, butyl amine and cyclohexyl amine; alkanol amines, e.g. ethanol amine; and alkoxyalkyl amines, e.g. 2-methoxyethyl amine. Examples of suitable secondary amines, i.e. amines having two organic substituents, include dialkyl amines, e.g. diethyl amine, dipropyl amine and di-isopropyl amine; dialkanol amines, e.g. diethanol amine, and pyrrolidine. Examples of suitable tertiary amines, i.e. amines having three organic substituents, include trialkyl amines, e.g. triethyl amine; trialkanol amines, e.g. triethanol amine; N,N-dialkyl alkanol amines, e.g. N,N-dimethyl ethanol amine. Examples of suitable quaternary amines, or quaternary ammonium compounds, i.e. amines having four organic substituents, include tetraalkanol amines, e.g. tetraethanol ammonium hydroxide and tetraethanol ammonium chloride; quaternary amines or ammonium compounds with both alkanol and alkyl substituents such as N-alkyltrialkanol amines, e.g. methyltriethanol ammonium hydroxide and methyltriethanol ammonium chloride; N,N-dialkyldialkanol amines, e.g. dimethyl diethanol ammonium hydroxide and dimethyl diethanol ammonium chloride; N,N,N-trialkyl alkanol amines, e.g. choline hydroxide and choline chloride; N,N,N-trialkyl benzyl amines, e.g. dimethyl cocobenzyl ammonium hydroxide, dimethyl cocobenzyl ammonium chloride and trimethyl benzyl ammonium hydroxide; tetraalkyl ammonium salts, e.g. tetramethyl ammonium hydroxide, tetramethyl ammonium chloride, tetraethyl ammonium hydroxide, tetraethyl ammonium chloride, tetra-propyl ammonium hydroxide, tetrapropyl ammonium chloride, diethyldimethyl ammonium hydroxide, diethyldimethyl ammonium chloride, triethylmethyl ammonium hydroxide and triethylmethyl ammonium chloride. Examples of suitable diamines include amino-alkylalkanol amines, e.g. aminoethylethanol amine, piperazine and nitrogen-substituted piperazines having one or two lower alkyl groups of 1 to 4 carbon atoms. Examples of preferred organic nitrogen-containing compounds include triethanol amine, diethanol-amine, dipropyl amine, aminoethyl ethanol amine, 2-methoxyethyl amine, N,N-dimethyl-ethanol amine, choline hydroxide, choline chloride, tetramethyl ammonium hydroxide, tetraethyl ammonium hydroxide and tetraethanol ammonium hydroxide.

Preferably, aqueous alkali metal silicate is added, either singly or in combination with aqueous sodium aluminate or aqueous organic nitrogen-containing compound.

When using aqueous alkali metal silicate in step (d) of the process of the invention, the aqueous alkali metal silicate is usually added to the reaction vessel at a rate of at least about 300 or at least about 350 and suitably at least about 400 or at least about 450 g $SiO_2$ per hour and kg ion exchange resin present in the reaction vessel. Usually, the rate is up to about 10000 or up to about 7000, suitably up to about 5,000 and preferably up to about 4000 g $SiO_2$ per hour and kg ion exchange resin present in the reaction vessel.

When using two or more materials comprising at least one alkaline material and at least one second material, the materials can be added in any order, preferably the alkaline material is added first followed by adding the second material.

In one embodiment, alkali metal silicate, e.g. sodium silicate, is added first and then an alkaline aluminum salt, e.g. aqueous sodium aluminate, is added. In another embodiment, aqueous alkali metal hydroxide, e.g. sodium hydroxide, is added first and then an alkaline aluminum salt, e.g. aqueous sodium aluminate, is added. The addition of aluminum compound provides an aluminated silica-based sol. Suitably, the addition of aluminum compound results in aluminum modification of the silica-based particles, preferably the particles are surface-modified by aluminum. The amount of aluminum compound used can be varied within wide limits. Usually the amount of aluminum compound added corresponds to a mole ratio of Si:Al of from about 1:1 to about 40:1, suitably from about 3:1 to about 30:1 and preferably from about 5:1 to about 20:1.

In another embodiment, alkali metal silicate, e.g. sodium silicate, is added first and then an organic nitrogen-containing compound, e.g. aqueous choline hydroxide, is added. In another embodiment, aqueous alkali metal hydroxide, e.g. sodium hydroxide, is added first and then an organic nitrogen-containing compound, e.g. aqueous choline hydroxide, is added. The addition of organic nitrogen-containing compound provides a nitrogen-modified silica-based sol. The amount of organic nitrogen-containing compound used can be varied within wide limits. Usually the amount of organic nitrogen-containing compound added corresponds to a mole ratio of Si:N of from 1:1 to 50:1, suitably from 2:1 to 40:1 and preferably from 2.5:1 to 25:1.

According to one embodiment of the invention, step (d) of the process comprises keeping or maintaining the temperature of the aqueous phase while adding said one or more alkaline materials to the aqueous phase at from at least about 0° C., suitably at least about 5° C. and preferably at least about 10° C. up to about 80° C. or up to 50° C., suitably up to about 40° C. and preferably up to about 35° C. This can be achieved by cooling or controlling the temperature of the reaction vessel while adding said one or more alkaline materials to the aqueous phase.

If desired, additional water can be to the reaction vessel during or after step (d) to lower the viscosity of the aqueous phase and reduce the speed of particle growth, particle aggregation and formation of elongated aggregates of silica-based particles.

In step (e) of the process, the ion exchange resin is separated from the aqueous phase, for example by filtration. This can be done after step (c), for example after step (c) but before step (d), or after step (d). It is also possible to separate the ion exchange resin from the aqueous phase during step (d). For example, the ion exchange resin can be separated after adding an alkaline material but before adding a second material. It is also possible to add part of one alkaline material, e.g. aqueous alkali metal silicate, then separating the ion exchange resin from the aqueous phase followed by adding the remaining part of the alkaline material. Preferably, the ion exchange resin is separated from the aqueous phase after step (d).

The concentration of the aqueous starting materials used in the process, e.g. the aqueous alkali metal silicate, aqueous alkali metal hydroxide and aqueous sodium aluminate, is preferably adjusted so as to provide a silica-based sol having the silica ($SiO_2$) contents as defined above.

If desired, the silica-based sol obtained after separating the ion exchange resin from the aqueous phase can be subjected to concentration. This can be carried out in known manner such as, for example, by osmotic methods, evaporation and ultrafiltration. The concentration can be carried out to provide a silica-based sol having the silica contents as defined above.

The silica-based sol according to this invention is suitable for use as a flocculating agent, for example in the production of pulp and paper, notably as a drainage and retention aid, and within the field of water purification, both for purification of different kinds of waste water and for purification specifically of white water from the pulp and paper industry. The silica-based sols can be used as a flocculating agent, notably as a drainage and retention aid, in combination with organic polymers which can be selected from anionic, amphoteric, non-ionic and cationic polymers and mixtures thereof. The use of such polymers as flocculating agents and as drainage and retention aids is well known in the art. The polymers can be derived from natural or synthetic sources, and they can be linear, branched or cross-linked. Examples of generally suitable organic polymers include anionic, amphoteric and cationic starches; anionic, amphoteric and cationic acrylamide-based polymers, including essentially linear, branched and cross-linked anionic and cationic acrylamide-based polymers; as well as cationic poly(diallyl-dimethyl ammonium chloride); cationic polyethylene imines; cationic polyamines; cationic poly-amideamines and vinylamide-based polymers, melamine-formaldehyde and urea-formalde-hyde resins. Suitably, the silica-based sols are used in combination with at least one cationic or amphoteric polymer, preferably cationic polymer. Cationic starch and cationic polyacrylamide are particularly preferred polymers and they can be used singly, together with each other or together with other polymers, e.g. other cationic and/or anionic polymers. The weight average molecular weight of the polymer is suitably above 1,000,000 and preferably above 2,000,000. The upper limit of the weight average molecular weight of the polymer is not critical; it can be about 50,000,000, usually 30,000,000 and suitably about 25,000,000. However, the weight average molecular weight of polymers derived from natural sources may be higher.

The present silica-based sol can also be used in combination with cationic coagulant(s), either with or without the co-use of the organic polymer(s) described above. Examples of suitable cationic coagulants include water-soluble organic polymeric coagulants and inorganic coagulants. The cationic coagulants can be used singly or together, i.e. a polymeric coagulant can be used in combination with an inorganic coagulant. Examples of suitable water-soluble organic polymeric cationic coagulants include cationic polyamines, polyamideamines, polyethylene imines, dicyandiamide condensation polymers and polymers of water soluble ethylenically unsaturated monomer or monomer blend which is formed of 50 to 100 mole % cationic monomer and 0 to 50 mole % other monomer. The amount of cationic monomer is usually at least 80 mole %, suitably 100 mole %. Examples of suitable ethylenically unsaturated cationic monomers include dialkylaminoalkyl (meth)-acrylates and acrylamides, preferably in quaternised form, and diallyl dialkyl ammonium chlorides, e.g. diallyl dimethyl ammonium chloride (DADMAC), preferably homopolymers and copolymers of DADMAC. The organic polymeric cationic coagulants usually have a weight average molecular weight in the range of from 1,000 to 700,000, suitably from 10,000 to 500,000. Examples of suitable inorganic coagulants include aluminum compounds, e.g. alum and polyaluminum compounds, e.g. polyaluminum chlorides, polyaluminum sulphates, polyaluminum silicate sulphates and mixtures thereof.

The components of the drainage and retention aids according to the invention can be added to the stock, or aqueous cellulosic suspension, in conventional manner and in any order. When using drainage and retention aids comprising a silica-based sol and organic polymer, it is preferred to add the organic polymer to the stock before adding the silica-based sol, even if the opposite order of addition may be used. It is further preferred to add the organic polymer before a shear stage, which can be selected from pumping, mixing, cleaning, etc., and to add the silica-based sol after that shear stage. When using drainage and retention aids comprising a silica-based sol and anionic and cationic organic polymers, it is preferred to add the cationic organic polymer to the stock before adding the silica-based sol and anionic organic polymer. When using a cationic coagulant, it is preferably added to the cellulosic suspension before the addition of the silica-based sol, preferably also before the addition of the organic polymer(s).

The components of the drainage and retention aids according to the invention are added to the stock to be dewatered in amounts which can vary within wide limits depending on, inter alia, type and number of components, type of furnish, filler content, type of filler, point of addition, etc. Generally the components are added in amounts that give better drainage and retention than is obtained when not adding the components. The silica-based sol is usually added in an amount of at least about 0.001% by weight, often at least about 0.005% by weight, calculated as $SiO_2$ and based on dry furnish, i.e. dry cellulosic fibers and optional fillers, and the upper limit is usually about 1.0% by weight and suitably about 0.5% by weight. Each of the organic polymers is usually added in an amount of at least about 0.001% by weight, often at least about 0.005% by weight, based on dry furnish, and the upper limit is usually about 3% by weight and suitably about 1.5% by weight. When using a cationic polymeric coagulant, it can be added in an amount of at least about 0.05% by weight, based on dry furnish. Suitably, the amount is in the range of from about 0.07 to about 0.5% by weight, preferably in the range from about 0.1 to about 0.35% by weight. When using an aluminum compound as the inorganic coagulant, the total amount added is usually at least about 0.05% by weight, calculated as $Al_2O_3$ and based on dry furnish. Suitably the amount is in the range of from about 0.1 to about 3.0% by weight, preferably in the range from about 0.5 to about 2.0% by weight.

Further additives which are conventional in papermaking can of course be used in combination with the additives according to the invention, such as, for example, dry strength agents, wet strength agents, optical brightening agents, dyes, sizing agents like rosin-based sizing agents and cellulose-reactive sizing agents, e.g. alkyl and alkenyl ketene dimers and ketene multimers, alkyl and alkenyl succinic anhydrides, etc. The cellulosic suspension, or stock, can also contain mineral fillers of conventional types such as, for example, kaolin, china clay, titanium dioxide, gypsum, talc and natural and synthetic calcium carbonates such as chalk, ground marble and precipitated calcium carbonate.

The process of this invention is used for the production of paper. The term "paper", as used herein, of course include not only paper and the production thereof, but also other cellulosic sheet or web-like products, such as for example board and paperboard, and the production thereof. The process can be used in the production of paper from different types of suspensions of cellulose-containing fibers and the suspensions should suitably contain at least about 25% by weight and preferably at least about 50% by weight of such fibers, based on dry substance. The suspension can be based on fibers from chemical pulp such as sulphate, sulphite and organosolv pulps, mechanical pulp such as thermomechanical pulp, chemo-thermomechanical pulp, refiner pulp and ground-wood pulp, from both hardwood and softwood, and can also be based on recycled fibers, optionally from de-inked pulps, and mixtures thereof. The pH of the suspension, the stock, can be within the range of from about 3 to about 10. The pH is suitably above about 3.5 and preferably within the range of from about 4 to about 9.

The invention is further illustrated in the following example which, however, is not intended to limit the same. Parts and % relate to parts by weight and % by weight, respectively, unless otherwise stated.

EXAMPLE 1

The following equipment and starting materials were used to produce silica-based sols according to the invention, unless otherwise stated:
(a) Reactor equipped with a stirrer;
(b) Ion exchange resin Amberlite™ IRC84SPI (available from Rohm & Haas) which was regenerated with sulphuric acid according to manufacturer's instruction;
(c) Aqueous sodium silicate solution having a $SiO_2$ content of about 23.9 wt. % and mole ratio of $SiO_2$ to $Na_2O$ of about 3.4; and
(d) Aqueous sodium aluminate solution containing about 24.5 wt. % $Al_2O_3$.

EXAMPLE 2

This example illustrates the preparation of a silica-based sol according to the invention:

Regenerated ion exchange resin (400 g) and water (1350 g) were added to a reactor. The obtained slurry was stirred and kept at a temperature of about 21° C. throughout the reaction. Aqueous sodium silicate (449 g) was added to the slurry during 5.5 min (addition rate of 2927 g $SiO_2$/(h×kg ion exchange resin)). The slurry was then stirred for about 19 minutes, whereupon the pH of the aqueous phase was about 7.4. Water (6×200 g) was added to the slurry during a period of 17 minutes, whereupon the slurry was further stirred for another 36 minutes until the pH was about 7.2. Aqueous sodium aluminate (33 g) was diluted with water (297 g) and the obtained dilute sodium aluminate solution was added to the slurry during 5 min whereupon the stirring was continued for 9 min and the obtained silica-based sol was then separated from the ion exchange resin.

The obtained sol of silica-based particles, designated Ex. 2, had a $SiO_2$ content of 3.1 wt. %, mole ratio Si:Na of 9.4, mole ratio Si:Al of 9.8, pH of 7.7, viscosity of 96 cP, axial ratio of 30, specific surface area of 1210 $m^2$/g and S-value of 6%.

EXAMPLE 3

This example illustrates the preparation of another silica-based sol according to the invention:

Regenerated ion exchange resin (332 g) and water (1350 g) were added to a reactor. The obtained slurry was stirred and kept at a temperature of about 21° C. throughout the reaction. Aqueous sodium silicate (449 g) was added to the slurry during 5.5 min (addition rate of 3526 g $SiO_2$/(h×kg ion exchange resin)). The slurry was then stirred for about 55 minutes, whereupon the pH of the aqueous phase was about 7.6. Water (4×200 g) was added to the slurry during a period of 15 minutes, whereupon the slurry was further stirred for another 44 minutes until the pH was about 7.5. Aqueous sodium aluminate (33 g) was diluted with water (297 g) and the obtained dilute sodium aluminate solution was added to the slurry during 4 min whereupon the stirring was continued for 5 min and the obtained silica-based sol was then separated from the ion exchange resin.

The obtained sol of silica-based particles, designated Ex. 3, had a $SiO_2$ content of 3.6 wt. %, mole ratio Si:Na of 10.3; mole ratio of Si:Al of 10.6, pH of 8.2, viscosity of 30 cP, axial ratio of 18, specific surface area of 1080 $m^2$/g and S-value of 8%.

EXAMPLE 4

This example illustrates the preparation of yet another silica-based sol according to the invention:

Regenerated ion exchange resin (400 g) and water (1350 g) were added to a reactor. The obtained slurry was stirred and kept at a temperature of about 21° C. throughout the reaction. Aqueous sodium silicate (449 g) was added to the slurry during 5.5 min (addition rate of 2927 g $SiO_2$/(h×kg ion exchange resin)). The slurry was then stirred for about 20 minutes, whereupon the pH of the aqueous phase was about 7.4. Aqueous sodium aluminate (33 g) was diluted with water (297 g) and the obtained dilute sodium aluminate solution was added to the slurry during 3 min together with additional water (440 g) whereupon the stirring was continued for 15 min. More water (440 g) was added to the slurry and the obtained silica-based sol was then separated from the ion exchange resin.

The obtained sol of silica-based particles, designated Ex. 4, had a $SiO_2$ content of 3.6 wt. %, mole ratio Si:Na of 10.9, mole ratio of Si:Al of 10.9, pH of 8.3, viscosity of 22 cP, axial ratio of 14, specific surface area of 1200 $m^2$/g and S-value of 8%.

Example 5

This example illustrates the preparation of still another silica-based sol according to the invention:

Regenerated ion exchange resin (4500 l; 5130 kg) and water (22 cubic meters) were added to a reactor. The obtained slurry was stirred and kept at a temperature of about 29° C. throughout the reaction. Aqueous sodium silicate (4400 kg; 29% by weight $SiO_2$) was added to the slurry at a rate of 8000 kg/h, corresponding to 452 g $SiO_2$/(h×kg ion exchange resin).

The slurry was then stirred for about 5 to 10 min, whereupon the pH of the aqueous phase was about 7. Additional aqueous sodium silicate (1600 kg) was added to the slurry at a rate of 8000 kg/h, and then aqueous sodium aluminate (650 kg) was added at a rate of 650 kg/h together with additional water (5300 kg/h) in line, whereupon the stirring was continued for 15 min. The aqueous phase was separated from the ion exchange resin while adding additional water (3000 kg), and the obtained sol of silica-based particles was subjected to ultra filtration.

The obtained sol of silica-based particles, designated Ex. 5, had a $SiO_2$ content of 6.5 wt. %, mole ratio Si:Na of 10, mole ratio of Si:Al of 10, pH of 8.3, viscosity of 22 cP, axial ratio of 14, specific surface area of 1100 $m^2$/g and S-value of 14%.

EXAMPLE 6

This example illustrates the preparation of another silica-based sol according to the invention:

Regenerated ion exchange resin (3815 kg) and water (21099 kg) were added to a reactor. The obtained slurry was stirred and kept at a temperature of about 25° C. throughout the reaction. Aqueous sodium silicate (4416 kg) was added to the slurry (addition rate of 623 g $SiO_2$/(h×kg ion exchange resin)). The slurry was then stirred for 9 minutes, whereupon the pH of the aqueous phase was about 7.5. Additional aqueous sodium silicate (1577 kg) was added to the slurry at a rate of 7278 kg/h, and then aqueous sodium aluminate (644 kg) was added at a rate of 1380 kg/h together with additional water (6007 kg). The obtained silica-based sol was separated from the ion exchange resin while adding additional water (4000 kg) to the slurry, and then subjected to ultra filtration.

The obtained sol of silica-based particles, designated Ex. 6, had a $SiO_2$ content of 6.6 wt. %, mole ratio Si:Na of 9, mole ratio of Si:Al of 9, pH of 8.3, viscosity of 146 cP, axial ratio of 19, specific surface area of 1110 $m^2$/g and S-value of 12%.

EXAMPLE 7

This example illustrates the preparation of yet another silica-based sol according to the invention:

Regenerated ion exchange resin (3745 kg) and water (20845 kg) were added to a reactor. The obtained slurry was stirred and kept at a temperature of about 28° C. throughout the reaction. Aqueous sodium silicate (4599 kg) was added to the slurry during 30 min (addition rate of 705 g $SiO_2$/(h×kg ion exchange resin)). The slurry was then stirred for another 12 minutes, whereupon the pH of the aqueous phase was about 7.4. Additional aqueous sodium silicate (1348 kg) was added to the slurry at a rate of 6221 kg/h, and then aqueous sodium aluminate (601 kg) was added at a rate of 522 kg/h together with additional water (6007 kg). The obtained silica-based sol was separated from the ion exchange resin while adding additional water (4000 kg) to the slurry, and then subjected to ultra filtration.

The obtained sol of silica-based particles, designated Ex. 7, had a $SiO_2$ content of 6.5 wt. %, mole ratio Si:Na of 8, mole ratio of Si:Al of 9, pH of 7.8, viscosity of 115 cP, axial ratio of 18, specific surface area of 1000 $m^2$/g and S-value of 12%.

EXAMPLE 8

This example illustrates the preparation of another silica-based sol according to the invention:

Regenerated ion exchange resin (4500 l; 5130 kg) and water (21 cubic meters) were added to a reactor. The obtained slurry was stirred and kept at a temperature of about 29° C. throughout the reaction. Aqueous sodium silicate (4400 kg; 29% by weight $SiO_2$) was added to the slurry at a rate of 7500 kg/h, corresponding to 420 g $SiO_2$/(h×kg ion exchange resin). The slurry was then stirred for about 9 min, whereupon the pH of the aqueous phase was about 7. Additional aqueous sodium silicate (1800 kg) was added to the slurry at a rate of 7500 kg/h, and then aqueous sodium aluminate (600 kg) was added at a rate of 650 kg/h together with additional water (5300 kg/h) in line, whereupon the stirring was continued for 15 min. The aqueous phase was separated from the ion exchange resin while adding additional water (3000 kg), and the obtained sol of silica-based particles was subjected to ultra filtration.

The obtained sol of silica-based particles, designated Ex. 8, had a $SiO_2$ content of 7.4 wt. %, mole ratio Si:Na of 10, mole ratio of Si:Al of 10, pH of 8.8, viscosity of 11 cP, axial ratio of 11.9, specific surface area of 1060 $m^2$/g and S-value of 17%.

EXAMPLE 9

The following products were used for comparison purposes in the drainage and retention performance tests of the Examples:

Ref. 1 is a silica sol commercially available under the trade name Nalco 8691 which had a pH of 10.9, viscosity of 3 cP, $SiO_2$ content of 11.4, axial ratio of 7 and S-value of 35%, and contained silica particles with a specific surface area of 800 $m^2$/g.

Ref. 2 is a silica-based sol prepared according to the general disclosure of WO 00/66491 which had a pH of 10,6, viscosity of 8 cP, $SiO_2$ content of 15, mole ratio Si:Na of 11, axial ratio of 8 and S-value of 35%, and contained silica-based particles with a specific surface area of 720 $m^2$/g.

Ref. 3 is a silica-based sol prepared according to the general disclosure of U.S. Pat. No. 5,368,833 which had a pH of 9, viscosity of 5 cP, $SiO_2$ content of 7.8, mole ratio Si:Na of 17, mole ratio Si:Al of 19, axial ratio of 9 and S-value of 21%, and contained silica-based particles with a specific surface area of 810 $m^2$/g.

Ref. 4 is bentonite in the form of an aqueous suspension

EXAMPLE 10

The following procedures and equipment were used to evaluate the performance of silica-based sols according to the invention and products used for comparison:

Drainage performance was evaluated by means of a Dynamic Drainage Analyser (DDA), available from Akribi AB, Sweden, which measures the time for draining a set volume of stock. The stock was stirred in a baffled jar at a speed of 1500 rpm throughout the test while additions of chemicals were made. A stock volume of 800 ml was drained through a wire when removing a plug and applying vacuum to that side of the wire opposite to the side on which the stock is present. Drainage performance is reported as the dewatering time (s). The additions were made according to the following general sequence:

(i) adding component D, if any, to the stock followed by stirring for (d) seconds,
(ii) adding component C, if any, to the stock followed by stirring for (c) seconds,
(iii) adding component B to the stock followed by stirring for (b) seconds,
(iv) adding component A to the stock followed by stirring for (a) seconds, and
(v) dewatering the stock while automatically recording the dewatering time.

The addition levels of polymers and bentonite were calculated as dry product on dry stock system, the addition levels of poly aluminum chloride were calculated as $Al_2O_3$ and based on dry stock system, and the addition level of silica or silica-based sols were calculated as $SiO_2$ and based on dry stock system.

Retention performance (first pass retention) was evaluated by means of a nephelometer by measuring the turbidity of the filtrate from the Dynamic Drainage Analyser (DDA), the white water, obtained by draining the stock obtained in the drainage performance test. Turbidity is reported in nephelometric units (NTU).

EXAMPLE 11

Drainage and retention performance was evaluated according to the general procedure of Example 10.

The cellulosic suspension, or stock, used in this Example was based on a furnish from a board mill producing liquid packaging board based on 50% by weight of peroxide bleached sulphate pulp and 50% by weight of uncoated broke. Stock consistency was 4.7 g/l, pH about 7.7, conductivity 1800 μS/cm, $Ca^{2+}$ ion content 40 mg/l and cationic demand–195 μeq./l. Component B was cationic starch (Perlbond 930) added in an amount of 10 kg/t followed by stirring for 15 seconds. Component A was either Ref. 1 or Ex. 5 added in varying amounts followed by stirring for 5 seconds. Table 1 shows the results at varying dosages of $SiO_2$.

TABLE 1

| Test No. | $SiO_2$ Dosage [kg/t] | Dewatering Time [s] Ref. 1 | Ex. 5 | Turbidity [NTU] Ref. 1 | Ex. 5 |
|---|---|---|---|---|---|
| 1 | 0 | 28.6 | 28.6 | 92 | 92 |
| 2 | 0.5 | 26 | 22.3 | 83 | 82 |
| 3 | 1 | 20.3 | 16 | 79 | 79 |
| 4 | 1.5 | 18.7 | 17 | 72 | 71 |

EXAMPLE 12

Drainage and retention performance was evaluated according to the general procedure of Example 10 using the stock of Example 11.

Component C was poly aluminum chloride (Eka ATC 8210) added in an amount of 0.3 kg/t followed by stirring for 10 seconds. Component B was cationic starch (Perlbond 930) added in an amount of 10 kg/t followed by stirring for 15 seconds. Component A was either Ref. 1 or Ex. 5 added in varying amounts followed by stirring for 5 seconds. Table 2 shows the results at various dosages of $SiO_2$.

TABLE 2

| Test No. | $SiO_2$ Dosage [kg/t] | Dewatering time [s] Ref. 1 | Ex. 5 | Turbidity [NTU] Ref. 1 | Ex. 5 |
|---|---|---|---|---|---|
| 1 | 0 | 26.7 | 26.7 | 87 | 87 |
| 2 | 0.25 | 21.7 | 19.9 | 86 | 76 |
| 3 | 0.5 | 18.7 | 17.1 | 84 | 74 |
| 4 | 1 | 15.7 | 14.3 | 76 | 75 |
| 5 | 1.5 | 13.7 | 12.9 | 77 | 76 |

EXAMPLE 13

Drainage and retention performance was evaluated according to the general procedure of Example 10 using the stock of Example 11.

Component D was a highly charged, low molecular weight cationic polyacrylamide (Eka ATC 5439) added in an amount of 0.3 kg/t followed by stirring for 10 seconds. Component C was a high molecular weight, cationic polyacrylamide (Eka PL 1510) added in an amount of 0.2 kg/t followed by stirring for 5 seconds. Component B was cationic starch (Perlbond 930) added in an amount of 5 kg/t followed by stirring for 20 seconds. Component A was either Ref. 1 or Ex. 5 added in varying amounts followed by stirring for 5 seconds. Table 3 shows the results at various dosages of $SiO_2$.

TABLE 3

| Test No. | $SiO_2$ Dosage [kg/t] | Dewatering time [s] Ref. 1 | Ex. 5 | Turbidity [NTU] Ref. 1 | Ex. 5 |
|---|---|---|---|---|---|
| 1 | 0 | 26.7 | 26.7 | 87 | 87 |
| 2 | 0.25 | 21.7 | 19.9 | 86 | 76 |
| 3 | 0.5 | 18.7 | 17.1 | 84 | 74 |
| 4 | 1 | 15.7 | 14.3 | 76 | 75 |
| 5 | 1.5 | 13.7 | 12.9 | 77 | 76 |

EXAMPLE 14

Drainage and retention performance was evaluated according to the general procedure of Example 10 using the stock of Example 11.

Component C was cationic starch (Perlbond 970) added in an amount of 8 kg/t followed by stirring for 15 seconds. Component B was a high molecular weight, anionic polyacrylamide (Eka PL 8660) added in an amount of 0.25 kg/t followed by stirring for 10 seconds. Component A was either Ref. 2 or Ex. 5 added in varying amounts followed by stirring for 5 seconds. Table 4 shows the results at various dosages of $SiO_2$.

TABLE 4

| Test No. | $SiO_2$ Dosage [kg/t] | Dewatering time [s] Ref. 2 | Ex. 5 | Turbidity [NTU] Ref. 2 | Ex. 5 |
|---|---|---|---|---|---|
| 1 | 0 | 28.5 | 28.5 | 109 | 109 |
| 2 | 0.1 | 21.8 | 23.3 | 128 | 93 |
| 3 | 0.25 | 18.3 | 17.4 | 112 | 95 |
| 4 | 0.5 | 12.6 | 12.5 | 105 | 95 |
| 5 | 1 | 8.5 | 8 | 85 | 80 |
| 6 | 1.5 | 6.9 | 6.7 | 85 | 73 |

EXAMPLE 15

Drainage and retention performance was evaluated according to the general procedure of Example 10 using the stock of Example 11.

Component C was cationic starch (Perlbond 970) added in an amount of 8 kg/t followed by stirring for 15 seconds. Component B was a high molecular weight, cationic polyacrylamide (Eka PL 1510) added in an amount of 0.25 kg/t followed by stirring for 10 seconds. Component A was either Ref. 2 or Ex. 5 added in varying amounts followed by stirring for 5 seconds. Table 5 shows the results at various dosages of $SiO_2$.

TABLE 5

| Test No. | SiO$_2$ Dosage [kg/t] | Dewatering time [s] Ref. 2 | Dewatering time [s] Ex. 5 | Turbidity [NTU] Ref. 2 | Turbidity [NTU] Ex. 5 |
|---|---|---|---|---|---|
| 1 | 0 | 29.3 | 29.3 | 170 | 170 |
| 2 | 0.25 | 20.2 | 14.8 | 143 | 125 |
| 3 | 0.5 | 13 | 10.3 | 126 | 106 |
| 4 | 1 | 7.9 | 7.1 | 103 | 95 |

EXAMPLE 16

Drainage and retention performance was evaluated according to the general procedure of Example 10.

The stock used in this Example was based on furnish from a fine paper mill producing uncoated copy paper containing about 65% by weight eucalyptus fibers and about 35% by weight PCC. Consistency was 12.5 g/l and pH was about 7.1.

Component B was cationic starch (Amylofax 2200) added in an amount of 5 kg/t followed by stirring for 20 seconds. Component A was either Ref. 3 or Ex. 5 added in varying amounts followed by stirring for 10 seconds. Table 6 shows the results at various dosages of SiO$_2$.

TABLE 6

| Test No. | SiO$_2$ Dosage [kg/t] | Dewatering time [s] Ref. 3 | Dewatering time [s] Ex. 5 | Turbidity [NTU] Ref. 3 | Turbidity [NTU] Ex.5 |
|---|---|---|---|---|---|
| 1 | 0 | 20.1 | 20.1 | 340 | 340 |
| 2 | 0.2 | 19.1 | 17.6 | 285 | 263 |
| 3 | 0.3 | 17 | 15.2 | 258 | 223 |
| 4 | 0.4 | 14.5 | 13.6 | 235 | 186 |
| 5 | 0.6 | 15.5 | 11.7 | 202 | 156 |

EXAMPLE 17

Drainage and retention performance was evaluated according to the general procedure of Example 10 using a stock similar to the one of Example 16 but furnish was taken from the secondary cleaner reject of the paper machine and the consistency was about 15 g/l.

Component C was cationic starch (Amylofax 2200) added in an amount of 10 kg/t followed by stirring for 20 seconds. Component B was a high molecular weight, cationic polyacrylamide (Eka PL 1710) added in an amount of 0.2 kg/t followed by stirring for 10 seconds. Component A was either Ref. 2 or Ex. 5 added in varying amounts followed by stirring for 10 seconds. Table 7 shows the results at various dosages of SiO$_2$.

TABLE 7

| Test No. | SiO$_2$ Dosage [kg/t] | Dewatering time [s] Ref. 2 | Dewatering time [s] Ex.5 | Turbidity [NTU] Ref. 2 | Turbidity [NTU] Ex. 5 |
|---|---|---|---|---|---|
| 1 | 0 | 7.1 | 7.1 | 205 | 205 |
| 2 | 0.1 | 6.7 | 6.3 | 134 | 117 |
| 3 | 0.2 | 6.9 | 5.6 | 117 | 102 |
| 4 | 0.3 | 5.6 | 4.8 | 102 | 95 |
| 5 | 0.4 | 5.9 | 4.6 | 94 | 82 |

Example 18

Drainage and retention performance was evaluated according to the general procedure of Example 10.

The stock used in this Example was based on furnish from a board mill producing liquid packaging board containing bleached sulphate pulp of 60% by weight birch and 40% by weight spruce/pine. Stock consistency was 6.3 g/l, pH about 8.3 and conductivity 1000 µS/cm.

Component B was cationic starch (HiCat 142) added in an amount of 6 kg/t followed by stirring for 15 seconds. Component A was either Ref. 4 or Ex. 5 added in varying amounts followed by stirring for 5 seconds. Table 8 shows the results at various dosages of component A.

TABLE 8

| Test No. | A Dosage [g/t] | Dewatering time [s] Ref. 4 | Dewatering time [s] Ex. 5 |
|---|---|---|---|
| 1 | 0 | 18.9 | 18.9 |
| 2 | 300 | 17.6 | 10.8 |
| 3 | 600 | 15.1 | 7.2 |
| 4 | 1200 | 10.9 | 6.3 |
| 5 | 2000 | 9.3 | 5.5 |
| 6 | 4000 | 7.5 | NA |
| 7 | 8000 | 8.4 | NA |

EXAMPLE 19

Drainage and retention performance was evaluated according to the general procedure of Example 10.

The stock used in this Example was from a liner mill producing white top liner consisting of a white top ply and a brown bottom ply. The white top ply stock was used and had a consistency of 8.4 g/l, pH of about 8.7 and conductivity of 800 µS/cm. Before the additions of components C, B and A, 100 kg/t of the PCC filler (Hypercarb FS260) was added separately to each test sample.

Component C was cationic starch (PB tapioka) added in an amount of 10 kg/t followed by stirring for 15 seconds. Component B was a cationic polyacrylamide (Percol 292NS) added in an amount of 0.4 kg/t followed by stirring for 20 seconds. Component A was Ref. 4, Ref. 3 or Ex. 5 added in varying amounts followed by stirring for 10 seconds. Table 9 shows the results at various dosages of component A.

TABLE 9

| Test No. | A Dosage [kg/t] | Dewatering time [s] Ref. 4 | Dewatering time [s] Ref. 3 | Dewatering time [s] Ex. 5 |
|---|---|---|---|---|
| 1 | 0 | 15.3 | 15.3 | 15.3 |
| 2 | 0.1 | NA | 13.4 | 11.6 |
| 3 | 0.2 | NA | 10.9 | 9.4 |
| 4 | 0.4 | NA | 8.8 | 7.9 |
| 5 | 0.6 | NA | 7.8 | 7.6 |
| 6 | 1 | 13.7 | NA | NA |
| 7 | 2 | 11.9 | NA | NA |
| 8 | 3 | 11.4 | NA | NA |
| 9 | 4 | 10.4 | NA | NA |

EXAMPLE 20

Drainage and retention performance was evaluated according to the general procedure of Example 10. The stock used in this Example was from a liner mill producing two-ply liner consisting of recycled pulp. The stock had a consistency of 13.5 g/l, pH of about 6.4 and conductivity of 2000 μS/cm.

Component B was a high molecular weight, cationic polyacrylamide (Eka PL 1510) added in an amount of 0.75 kg/t followed by stirring for 10 seconds. Component A was either Ref. 3 or Ex. 5 added in varying amounts followed by stirring for 10 seconds. Table 10 shows the results at various dosages of $SiO_2$.

TABLE 10

| Test No. | $SiO_2$ Dosage [kg/t] | Dewatering time [s] | | Turbidity [NTU] | |
|---|---|---|---|---|---|
| | | Ref. 3 | Ex. 5 | Ref. 3 | Ex. 5 |
| 1 | 0 | 12.3 | 12.3 | 250 | 250 |
| 2 | 0.1 | 10 | 9.4 | 240 | 223 |
| 3 | 0.2 | 9.3 | 8.1 | 220 | 220 |
| 4 | 0.3 | 9.2 | 7.9 | 238 | 214 |

EXAMPLE 21

Retention performance was evaluated by means of a Dynamic Drainage Jar (DDJ), available from Paper Research Materials, Inc., which measures the fines retention when draining a set volume of stock. The stock was stirred in a baffled jar at a speed of 1200 rpm throughout the test. A stock volume of 500 ml was used and additions of chemicals were made. The stock was drained through a wire when opening a tube clamp, the tube connected to an opening in the bottom of the jar below the wire. Drainage was collected in a beaker during 30 seconds at a flow rate partly set by the size of a tip opening connected to the tube. Flow rate was approximately 130-160 ml/min. The amount of dry material in the beaker was determined by evaporation at 105° C. in an oven. The total fines fraction was determined separately. The results were reported as fines retention (%).

The additions of chemicals were made according to the general sequence of Example 10.

The stock used in this Example was based on a furnish containing chemical pulp of 80% hardwood and 20% softwood. The furnish contained 50% of this pulp and 50% ground calcium carbonate. Salts were added to create a conductivity of about 1.5 mS/cm, pH was about 8.1 to 8.2 and the pulp consistency was about 5 g/l.

Component C was a cationic starch (Perlbond 930) added in an amount of 10 kg/t followed by stirring for 20 seconds. Component B was a high molecular weight, cationic polyacrylamide (Eka PL 1510) added in an amount of 0.5 kg/t followed by stirring for 20 seconds. Component A was either of Ref. 3, Ex. 2, Ex. 4, Ex. 5 or Ex. 7 added in varying amounts followed by stirring for 10 seconds. Table 11 shows the results at various dosages of $SiO_2$.

TABLE 11

| Test No. | $SiO_2$ Dosage [kg/t] | Fines Retention [%] | | | | |
|---|---|---|---|---|---|---|
| | | Ref. 3 | Ex. 2 | Ex. 4 | Ex. 5 | Ex. 7 |
| 1 | 0 | 27 | 27 | 27 | 27 | 27 |
| 2 | 0.2 | 31 | 45 | 45 | 41 | 42 |
| 3 | 0.35 | 42 | 58 | 55 | 50 | 54 |
| 4 | 0.5 | 48 | 62 | 60 | 56 | 58 |

EXAMPLE 22

Drainage performance was evaluated according to the general procedure of Example 10 using a stock similar to the one used in Example 21.

Component B was a high molecular weight, cationic polyacrylamide (Eka PL 1510) added in an amount of 2.0 kg/t followed by stirring for 20 seconds. Component A was either of Ref. 3, Ex. 2, Ex. 3, Ex. 4, Ex. 5 or Ex. 7 added in varying amounts followed by stirring for 10 seconds. Table 12 shows the results at various dosages of $SiO_2$.

TABLE 12

| Test No. | $SiO_2$ Dosage [kg/t] | Dewatering [s] | | | | | |
|---|---|---|---|---|---|---|---|
| | | Ref. 3 | Ex. 2 | Ex. 3 | Ex. 4 | Ex. 5 | Ex. 7 |
| 1 | 0 | 20.0 | 20.0 | 20.0 | 20.0 | 20.0 | 20.0 |
| 2 | 0.05 | 18.2 | 15.4 | NA | NA | 16.3 | 16.0 |
| 3 | 0.1 | 15.6 | 11.4 | 11.7 | 12.1 | 12.6 | 12.9 |
| 4 | 0.2 | 11.4 | 7.8 | 7.8 | 7.5 | 8.7 | 8.9 |
| 5 | 0.3 | 8.4 | 6.1 | 6.0 | 6.0 | 6.8 | 6.8 |
| 6 | 0.5 | 6.2 | 4.7 | 4.9 | 4.4 | 4.8 | 4.8 |

EXAMPLE 23

Drainage performance was evaluated according to the general procedure of Example 10 using a stock similar to the one used in Example 21.

Component C was a cationic starch (Perlbond 930) added in an amount of 10 kg/t followed by stirring for 15 seconds. Component B was a high molecular weight, cationic polyacrylamide (Eka PL 1510) added in an amount of 0.5 kg/t followed by stirring for 10 seconds. Component A was either of Ref. 3, Ex. 2, Ex. 3, Ex. 4, Ex. 5, Ex. 6 or Ex. 7 added in varying amounts followed by stirring for 10 seconds. Table 13 shows the results at various dosages of $SiO_2$.

TABLE 13

| Test No. | $SiO_2$ Dosage [kg/t] | Dewatering [s] | | | | | | |
|---|---|---|---|---|---|---|---|---|
| | | Ref. 3 | Ex. 2 | Ex. 3 | Ex. 4 | Ex. 5 | Ex. 6 | Ex. 7 |
| 1 | 0 | 27.2 | 27.2 | 27.2 | 27.2 | 27.2 | 27.2 | 27.2 |
| 2 | 0.1 | 21.9 | 17.7 | 17.4 | 18.1 | 18.5 | 18.7 | 19.0 |
| 3 | 0.2 | 17.3 | 12.1 | 12.4 | 13.5 | 13.6 | 13.7 | 13.4 |
| 4 | 0.3 | 14.8 | 10.4 | 10.4 | 10.6 | 11.9 | 11.7 | 11.4 |
| 5 | 0.5 | 11.8 | 8.5 | 8.7 | 8.8 | 9.3 | 9.5 | 8.9 |

EXAMPLE 24

Axial ratios were measured and calculated as described by D. Biddle, C. Walldal and S. Wall in Colloids and Surfaces, A: Physiochemical and Engineering Aspects 118 (1996), 89-95, determining dimensions and axial ratios of equivalent unsolvated prolate ellipsoids. This ellipsoid model is characterised by the ratio between the longer diameter (a) and the shorter diameter (b), the axial ratio being defined as a/b. The model used is a combination of data obtained from intrinsic viscosity measurements and dynamic light scattering measurements and the relations of Simha and Perrin for the intrinsic viscosity and fractional factors respectively of ellipsoids of revolution. These data were then used to iterate a mathematical fit to the ellipsoid form, thus giving an axial ratio, a/b.

Table 14 shows axial ratios of Ex. 2, Ex. 3, Ex. 4, Ex. 5, Ex. 6, Ex. 7 and Ref. 3 as well as the improvements in retention (R) and dewatering (D) improvements observed in Examples 21, 22 and 23 when using the sols of silica-based particles according to the invention over Ref. 3 at the dosage of 0.5 kg/t $SiO_2$.

TABLE 14

| Silica-Based Sol | Axial Ratio [a/b] | Retention Improvement [%] Example 21 | Dewatering Improvement [%] Example 22 | Dewatering Improvement [%] Example 23 |
|---|---|---|---|---|
| Ref. 3 | 9 | 0 (ref) | 0 (ref) | 0 (ref) |
| Ex. 2 | 30 | 29 | 24 | 28 |
| Ex. 3 | 18 | NA | 20 | 26 |
| Ex. 4 | 14 | 25 | 28 | 25 |
| Ex. 5 | 14 | 17 | 21 | 21 |
| Ex. 6 | 19 | NA | NA | 19 |
| Ex. 7 | 18 | 21 | 21 | 25 |

EXAMPLE 25

Drainage performance was evaluated according to the general procedure of Example 10 using a stock similar to the one used in Example 21.

Component B was a high molecular weight, cationic polyacrylamide (Eka PL 1510) added in an amount of 0.8 kg/t followed by stirring for 20 seconds. Component A was either Ref. 3 or Ex. 8 added in varying amounts followed by stirring for 10 seconds. Table 15 shows the results at various dosages of $SiO_2$.

TABLE 15

| Test No. | $SiO_2$ Dosage [kg/t] | Dewatering time [s] Ref. 3 | Dewatering time [s] Ex. 8 |
|---|---|---|---|
| 1 | 0 | 14.4 | 14.4 |
| 2 | 0.1 | 10.5 | 9.56 |
| 3 | 0.2 | 8.14 | 6.65 |
| 4 | 0.4 | 5.96 | 5.38 |

The invention claimed is:

1. Sol containing silica-based particles having an axial ratio in the range of from about 10 to about 100 and specific surface area of at least about 600 m²/g, wherein the sol is modified with aluminum.

2. Sol containing silica-based particles having an axial ratio of at least about 10 and S-value up to about 25%.

3. The sol according to claim 1, wherein the axial ratio is in the range of from 10 to 50.

4. The sol according to claim 3, wherein the axial ratio is in the range of from 11 to 35.

5. The sol according to claim 1, wherein the silica-based particles have a specific surface area in the range of from 800 to 1600 m²/g.

6. The sol according to claim 1, wherein the silica-based particles have a specific surface area of at least about 1000 m²/g.

7. The sol according to claim 1, wherein the silica-based particles are surface-modified with aluminum.

8. The sol according to claim 1, wherein the sol has a silica content of at least about 3% by weight.

9. The sol according to claim 1, wherein the sol has an S-value in the range of from about 5 to about 20%.

10. The sol according to claim 1, wherein the sol has a pH in the range of from about 7.0 to about 10.0.

11. The sol according to claim 1, wherein the sol is aqueous.

12. The sol according to claim 2, wherein the axial ratio is in the range of from 10 to 100.

13. The sol according to claim 12, wherein the axial ratio is in the range of from 11 to 35.

14. The sol according to claim 2, wherein the silica-based particles have a specific surface area in the range of from 800 to 1600 m²/g.

15. The sol according to claim 2, wherein the silica-based particles have a specific surface area of at least about 1000 m²/g.

16. The sol according to claim 2, wherein the silica-based particles are surface-modified with aluminum.

17. The sol according to claim 2, wherein the sol has a silica content of at least about 3% by weight.

18. The sol according to claim 2, wherein the sol has an S-value in the range of from about 5 to about 20%.

19. The sol according to claim 2, wherein the sol has a pH in the range of from about 7.0 to about 10.0.

20. The sol according to claim 2, wherein the sol is aqueous.

21. The sol according to claim 1, wherein the axial ratio is at least 12.

22. The sol according to claim 21, wherein the axial ratio is at least 13.

23. The sol according to claim 6, wherein the silica-based particles have a specific surface area in the range of from 1000 to 1600 m²/g.

24. The sol according to claim 1, wherein the sol has an S-value of from about 6 to about 25%.

25. The sol according to claim 1, wherein the sol has a mole ratio of Si:Al of from about 1:1 to 40:1.

26. The sol according to claim 1, wherein the sol has a mole ratio of Si:X, where X=alkali metal, of from 5:1 to 30:1.

27. The sol according to claim 26, wherein the sol has a mole ratio of Si:X, where X=alkali metal, of from 5:1 to 15:1.

28. The sol according to claim 27, wherein the sol has a mole ratio of Si:X, where X=alkali metal, of at least 8:1.

29. The sol according to claim 27, wherein the sol has a mole ratio of Si:X, where X=alkali metal, of up to 12:1.

30. The sol according to claim 27, wherein the silica-based particles have a specific surface area in the range of from 800 to 1600 m²/g.

31. Aqueous sol containing silica-based particles having a silica content of at least about 3% by weight, an axial ratio of at least about 10, a mole ratio of Si:X, where X=alkali metal, of from 5:1 to 15:1 and specific surface area of at least about 1000 m²/g, wherein the sol is modified with aluminum and has a mole ratio of Si:Al of from about 1:1 to 40:1.

32. The sol according to claim 31, wherein the sol has an S-value in the range of from about 5 to about 20%.

33. The sol according to claim 31, wherein the axial ratio is from about 11 to about 35.

34. The sol according to claim 31, wherein the axial ratio is at least 12.

35. The sol according to claim 31, wherein the axial ratio is at least 13.

36. The sol according to claim 2, wherein the sol is modified with aluminum.

37. The sol according to claim 2, wherein the sol has a mole ratio of Si:Al of from about 1:1 to 40:1.

38. Sol containing silica-based particles having an axial ratio of at least about 10 up to about 100 and specific surface area of at least about 700 m²/g.

39. The sol according to claim 38, wherein the axial ratio is at least about 11.

40. The sol according to claim 38, wherein the axial ratio is at least 12.

41. The sol according to claim 38, wherein the axial ratio is at least 13.

42. The sol according to claim 38, wherein the axial ratio is up to 50.

43. The sol according to claim 38, wherein the axial ratio is up to about 35.

44. The sol according to claim 38, wherein the silica-based particles have a specific surface area in the range of from 800 to 1600 $m^2/g$.

45. The sol according to claim 38, wherein the silica-based particles have a specific surface area of at least about 1000 $m^2/g$.

46. The sol according to claim 38, wherein the sol is aqueous.

47. The sol according to claim 38, wherein the sol has a silica content of at least about 3% by weight.

* * * * *